Aug. 21, 1923.
E. F. WALSH
1,465,658
HYDRAULIC HOIST FOR MOTOR VEHICLES
Filed Aug. 23, 1920   3 Sheets-Sheet 3
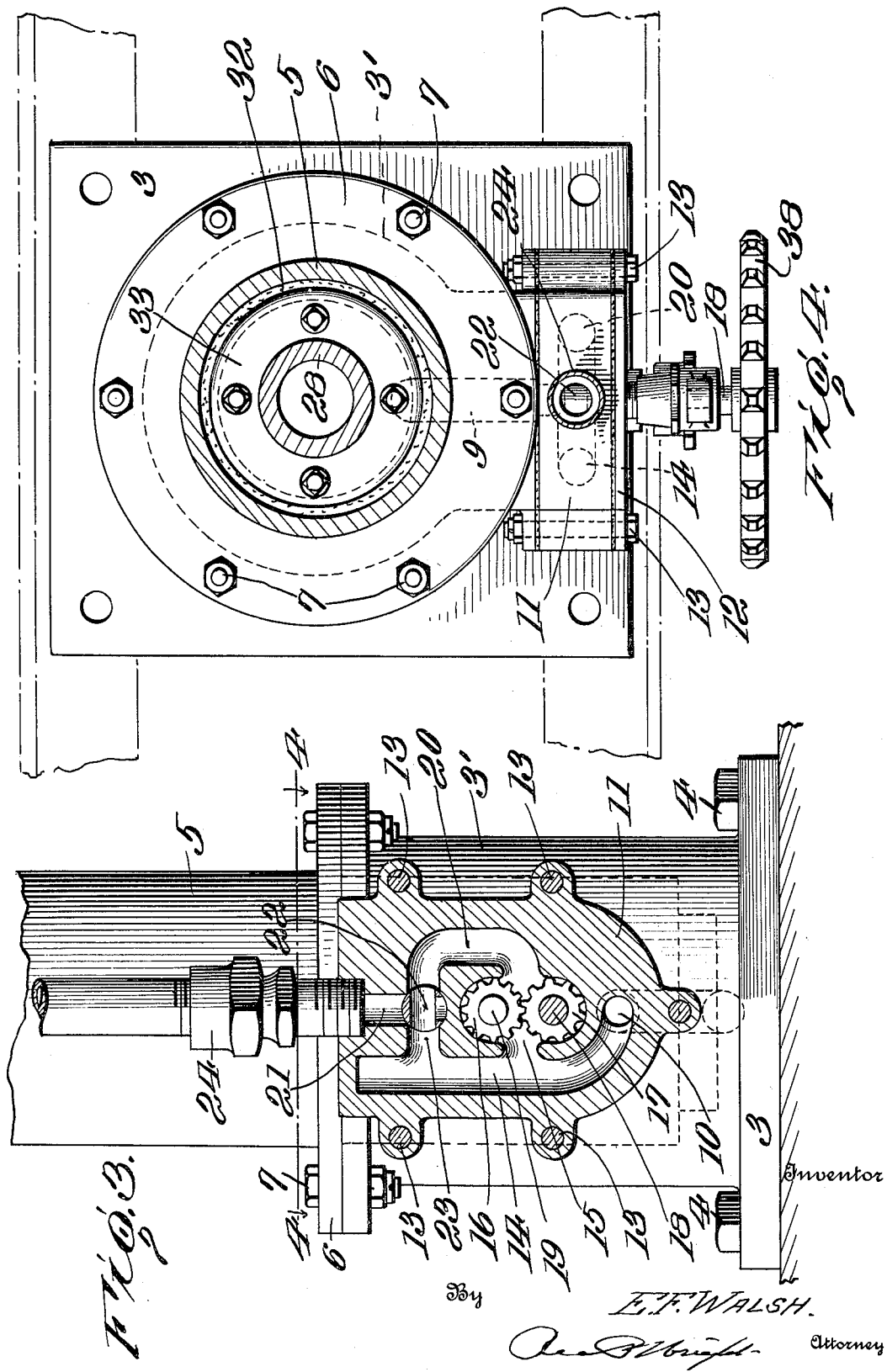
Inventor
E. F. WALSH
By
Attorney Patented Aug. 21, 1923.

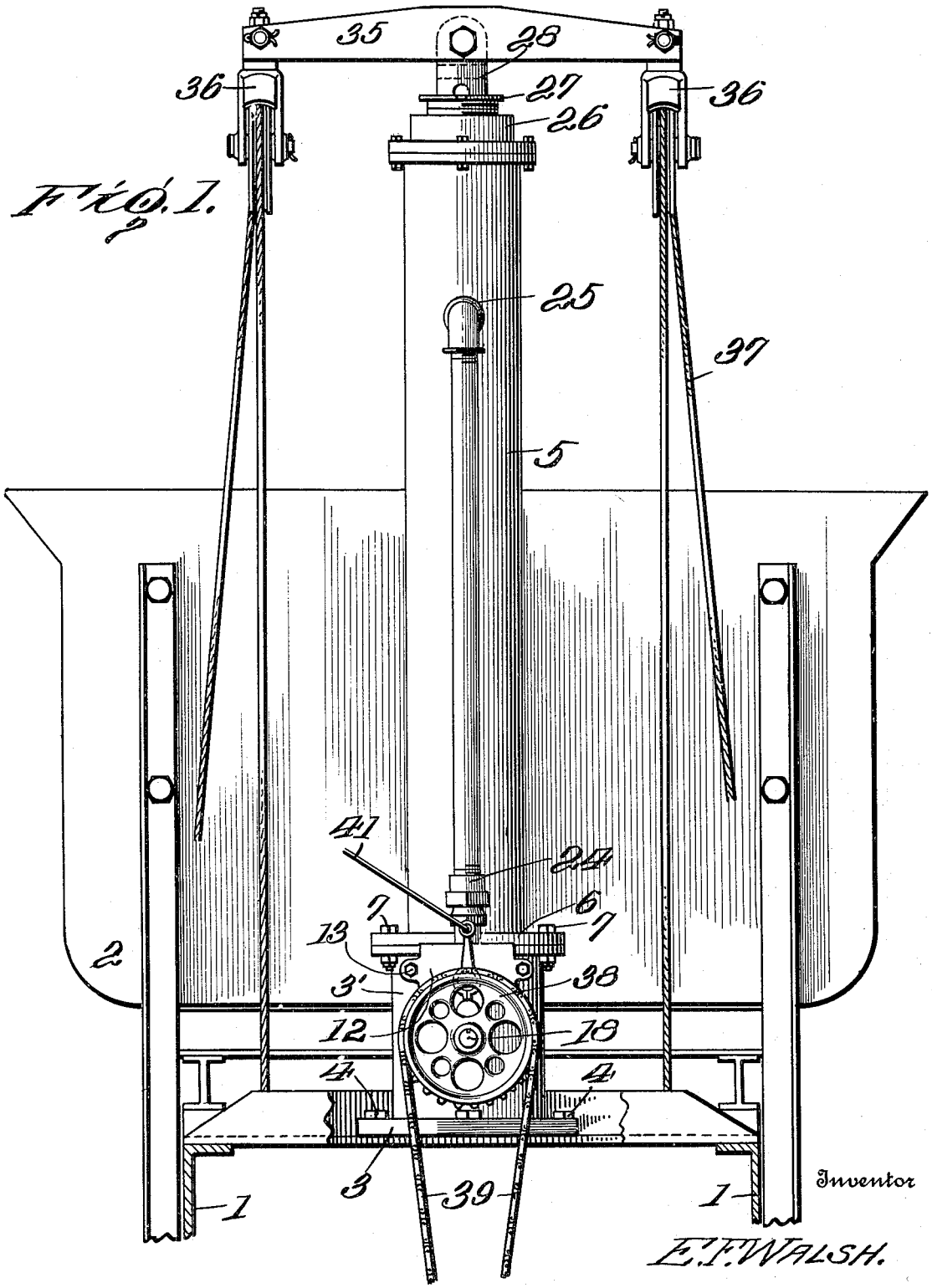

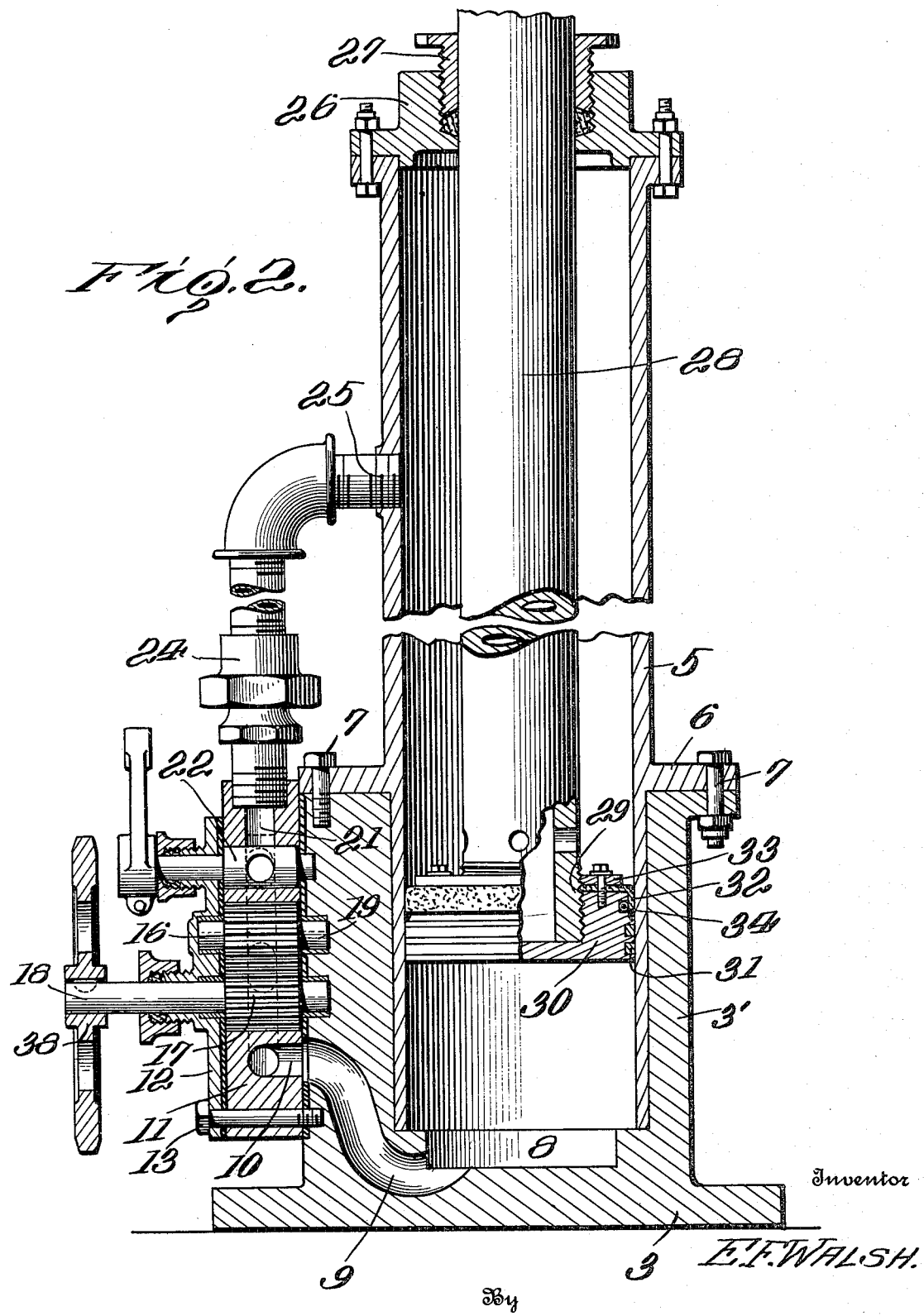

1,465,658

UNITED STATES PATENT OFFICE.

EDWARD F. WALSH, OF MARION, INDIANA, ASSIGNOR TO SUPERIOR BOILER WORKS, OF MARION, INDIANA, A CORPORATION OF INDIANA.

HYDRAULIC HOIST FOR MOTOR VEHICLES.

Application filed August 23, 1920. Serial No. 405,387.

*To all whom it may concern:*

Be it known that I, EDWARD F. WALSH, a citizen of the United States, residing at Marion, in the county of Grant and State of Indiana, have invented certain new and useful Improvements in Hydraulic Hoists for Motor Vehicles, of which the following is a specification, reference being had therein to the accompanying drawing.

This invention relates to certain new and useful improvements in hydraulic hoists for motor vehicles and is especially adapted to be used in connection with motor trucks having dumping bodies, the object being to provide a hydraulic hoist which is formed of a single unit in such a manner that the same can be mounted on the frame of a vehicle and driven by the propeller shaft or engine shaft.

Another and further object of the invention is to provide a hoisting mechanism in which the gear pump is fastened securely to the base of the cylinder in such a manner that a compact hoist is formed which eliminates the use of a high pressure line pipe.

A still further object of the invention is to provide a hoisting mechanism in which the gear pump is in communication with the cylinder of the pump through a passage formed in the base of the cylinder and with the top of the cylinder through a low pressure line pipe which is controlled by a valve by means of which the piston can be held in any position desired whether the gear pump is in operation or not.

Other and further objects and advantages of the invention will be hereinafter set forth and the novel features thereof defined by the appended claims.

In the drawings,

Figure 1 is a transverse vertical section through a motor vehicle showing the application of my improved construction of hoisting mechanism thereto.

Figure 2 is a vertical enlarged section through the hoisting mechanism.

Figure 3 is a vertical section through the gear pump housing; and

Figure 4 is a horizontal section taken on line 4—4 of Figure 3.

In the drawings 1 indicates a frame of a motor vehicle such as a motor truck and 2 the tilting body, the particular construction of which does not enter into the novelty of my invention and is herein shown of the ordinary construction now in use. Mounted in a suitable cross bar supported by the frame 1 of the motor vehicle is a base 3 which is securely bolted in position thereon by bolts 4, as clearly shown, said base having an upwardly extending cylindrical portion 3' forming a housing for the lower end of a cylinder 5 which has an annular flange 6 secured to an annular flange formed on the upper edge of the cylindrical portion 3' of the base 3 by bolts 7, the lower end of the cylinder extending down into the base as clearly shown and by this construction the base and cylinder are so united that a tight joint is formed so as to prevent oil leaks. The chamber of the base in which the depending end of the cylinder 5 extends is provided with a reduced portion 8 in its bottom having a passage 9 extending upwardly and outwardly through the enlarged portion of the cylindrical portion 3'. The passage 9 communicates with an outlet 10 formed in a pump housing 11 arranged against the enlarged portion of the cylindrical portion 3' and is provided with a cover 12 securely bolted to the enlarged portion of the cylindrical portion of the base 3 by bolts 13 which secures the cover to the housing and the housing to the base 3.

Extending from the outlet 10 of the pump housing is a passage 14 in communication with the gear chamber as shown at 15 in which are mounted gears 17 and 16 carried by shafts 18 and 19 mounted in suitable bushings formed in bearings in the housing and cover plate as clearly shown. The housing is also provided with a passage 20 which communicates with an outlet 21 which outlet is controlled by valve 22. The passage 14 is provided with a branch 23 which communicates with the outlet 21 and by the particular construction of valve hereinshown the same can be adjusted to various positions so as to cause the fluid to pass through the various passages as will be hereinafter fully described. The outlet 21 is connected to a low pressure line pipe 24, the upper end of which is connected to the cylinder 5 adjacent its upper end as shown at 25.

The upper end of the cylinder is closed by cap 26 securely bolted to the flanged upper end as clearly shown and is provided with a stuffing box 27 through which extends a hollow piston rod 28 having a threaded lower end 29 which is screwed into a piston 30 provided with piston rings 31 and a cup 32 secured into position by ring 33 and provided with means for holding the same expanded in the form of a spring 34 which is seated in a groove formed in the piston as clearly shown. The upper end of the piston rod 28 carries a pivoted cross arm 35 provided with sheave swivel blocks 36 over which pass cables 37, the free ends of which are adapted to be connected to the tilting body 2 of the motor vehicle in the ordinary manner so that when fluid is forced into the lower end of the cylinder the piston will be raised which will raise the free end of the tilting body upwardly so as to discharge its load.

The shaft 18 of the lower gear 17 extends outwardly through a stuffing box as shown and has keyed thereon a sprocket wheel 38 over which passes a sprocket chain 39 which is adapted to be driven by a sprocket driven directly from the engine shaft or through a series of gearing so that when the gears are operated, the fluid such as oil within the cylinder can be forced into the lower end of the cylinder under pressure so as to raise the piston therein.

The valve 22 is controlled by a lever 41 and by adjusting the same into one position fluid can be by-passed from the lower end of the cylinder through the passages 9, 14 and 23 out through the outlet 21 to the top of the cylinder so as to allow the piston to drop within the cylinder in order to lower the tilting body. By shifting the valve into the position shown in Figure 3 the oil will circulate through the pump housing and the piston within the cylinder will be held in its adjusted position. By shifting the valve to open the outlet 21 and close the passage 23 the oil will be drawn from the top of the cylinder and expelled through the gears into the passage 14 and under pressure through the outlet 10 into the passage 9 into the bottom of the cylinder so as to raise the piston in order to tilt the body of the truck.

A suitable gasket is arranged between the enlargement of the base of the pump housing and the pump housing and its cover in order to form an oil tight joint whereby a hoisting mechanism is produced in which wasting of the oil is eliminated.

From the foregoing description it will be seen that I have provided a hoisting mechanism composed of a cylinder having a base of sufficient strength to support the hoisting mechanism when supported in the frame of a vehicle, said cylinder having a pump housing attached directly thereto in communication with the upper and lower end of the cylinder, the upper outlet being controlled by a three-way valve whereby I am able to control the fluid expelled by the pump so as to hold the piston within the cylinder at any desired point.

What I claim is:—

1. A hoisting mechanism comprising a base having an upwardly extending cylindrical portion provided with an annular flange at its upper edge, a cylinder extending into said cylindrical portion having a flange resting on the flange of the cylindrical portion of said base and secured thereto, the cylindrical portion of said base being provided with a lateral enlarged flattened portion having a passage extending therethrough in communication with the lower end of said cylinder, a gear pump housing secured to the enlarged portion of the cylindrical portion of said base having an outlet passage at its lower end in communication with the passage of said base and an outlet passage at its upper end in communication with the upper end of said cylinder, a removable cover for said pump housing, bearings formed in said cover and enlarged portion of said base, shafts mounted on said bearings carrying gears within said gear pump housing and a piston working in said cylinder.

2. A hoisting mechanism comprising a base having a lateral enlargement, a cylinder carried by said base, said enlargement being provided with a passage extending therethrough and in communication with the lower end of said cylinder, a pump housing arranged against the enlarged portion of said base having a removable cover and provided with a passage at its lower end in communication with the passage of said base and an outlet passage at its upper end in communication with said cylinder, said cover and enlarged portion being provided with bearings, shafts mounted in said bearings carrying gears and bolts extending through said cover in the said enlarged portion for securing said pump housing and cover in position upon the enlarged portion of said base.

In testimony whereof I have hereunto affixed my signature in the presence of two witnesses.

EDWARD F. WALSH.

Witnesses:
GERTRUDE MORGAN,
L. V. PERDIUE.